United States Patent [19]
Kobayashi et al.

[11] Patent Number: 5,671,820
[45] Date of Patent: Sep. 30, 1997

[54] BACKHOE HAVING AN ENGINE HOOD WITH A DRIVER'S SEAT MOUNTED THEREON

[75] Inventors: Masahiko Kobayashi; Shizuo Shimoie; Shizuo Demizu, all of Sakai, Japan

[73] Assignee: Kubota Corporation, Japan

[21] Appl. No.: 599,955

[22] Filed: Feb. 14, 1996

[30] Foreign Application Priority Data

| Feb. 17, 1995 | [JP] | Japan | 7-028987 |
| Feb. 17, 1995 | [JP] | Japan | 7-028989 |
| Feb. 17, 1995 | [JP] | Japan | 7-028991 |
| Feb. 17, 1995 | [JP] | Japan | 7-029194 |

[51] Int. Cl.$^6$ .................................................. B62D 33/067
[52] U.S. Cl. .................. 180/68.1; 180/69.21; 180/89.16; 180/328; 296/66
[58] Field of Search .................. 180/68.1, 68.4, 180/69.21, 69.25, 69.24, 89.13, 89.14, 89.16, 89.19, 327, 328; 172/431, 435; 296/63, 66

[56] References Cited

U.S. PATENT DOCUMENTS

| 2,931,452 | 4/1960 | Mackie | 180/69.21 |
| 3,788,418 | 1/1974 | Clancy et al. | |
| 3,981,375 | 9/1976 | Crawford | 180/69.21 |
| 4,040,501 | 8/1977 | Haswell | 180/89.18 |
| 4,930,591 | 6/1990 | Lanius et al. | |
| 5,199,521 | 4/1993 | Samejima et al. | 180/68.1 |

FOREIGN PATENT DOCUMENTS

| 0496886A1 | 8/1992 | European Pat. Off. |
| 5156664 | 6/1993 | Japan |
| 5064231 | 8/1993 | Japan |
| 5193377 | 8/1993 | Japan |
| 6207419 | 7/1994 | Japan |
| 6072443 | 9/1994 | Japan |

OTHER PUBLICATIONS

Patent Abstracts of Japan, vol. 016, No. 523 (M–1331), 04 194128, Jul. 14, 1992, Japan.

*Primary Examiner*—Brian L. Johnson
*Assistant Examiner*—Avraham Lerner
*Attorney, Agent, or Firm*—Webb Ziesenheim Bruening Logsdon Orkin & Hanson, P.C.

[57] ABSTRACT

A backhoe having an engine hood defining a recess for receiving part of a bottom surface of a driver's seat, and an engine mounted in horizontal posture inside the engine hood. The engine hood includes, in plan view, a first hood space corresponding to the recess, a second hood space and a third hood space arranged laterally of the recess, and a fourth hood space disposed rearwardly of the recess. A cooling air intake is formed in one of the second and third hood spaces, and a cooling air outlet is formed in the other of the second and third hood spaces.

14 Claims, 9 Drawing Sheets

BACKHOE HAVING AN ENGINE HOOD WITH A DRIVER'S SEAT MOUNTED THEREON

BACKGROUND OF THE INVENTION

1. Field of the Invention

The present invention relates to backhoes, and more particularly to a backhoe having an engine hood defining a recess for receiving a driver's seat.

2. Description of the Related Art

An example of conventional backhoes is disclosed in the Japanese patent application laid open under No. 5-156664. This backhoe has an engine hood defining a flat upper surface on which a driver's seat is mounted. Where a swivel deck has a fixed height, the engine hood has a height from the ground which is determined by a relatively high component such as a radiator. Since the engine hood has a flat upper surface, naturally the driver's seat has a mounting height determined by the upper surface of the hood. Based on the height of the driver's seat, though dependent on a standard height of the radiator or the like, a level difference (or distance) between an upper surface of the swivel deck and foot rests tends to be a little too large. Thus, where the foot rests are formed as low as possible in order to reduce the height of the backhoe as a whole, it is desirable to determine a position of the driver's seat by adding an appropriate level difference computed from the point of view of human engineering. This is because the height of the backhoe as a whole may be reduced if the foot rests are lowered and the driver's seat is situated in an appropriate position. In order to restrict the height of the entire backhoe to a predetermined level while maintaining an ideal level difference (between foot rests and driver's seat) from the point of view of human engineering, it is necessary to recess part of the upper surface of the engine hood to receive the driver's seat.

An improvement in the construction of an engine hood of a backhoe is disclosed in the Japanese patent application laid open under No. 6-207419, for example, in which the engine hood defines a recess for receiving a driver's seat. In this prior example, as seen from FIGS. 1, 5 and 6 of the published application, the driver's seat is mounted on an upper surface of the engine hood which defines a recess for receiving the seat. With a seat receiving surface of the engine hood recessed, an engine is mounted in horizontal posture inside a space formed under the seat receiving surface, and a radiator and other engine accessories are arranged in portions of the space laterally of the recess. As seen from FIG. 6 of the published application, a canopy mount is disposed adjacent the radiator. The canopy mount acts also as a duct element for receiving air having passed through the radiator. With the canopy mount acting also as a duct element, the engine's drive shaft must extend at an angle to a transverse direction of the backhoe body, and the canopy mount itself must be designed to fit a radiator exhaust duct. This complicated structure leaves room for improvement. Further, this prior application discloses an opening element (with no reference numeral affixed thereto) in a rear position of the engine hood, which appears to open horizontally.

This opening element is too small for allowing a maintenance operation for the engine, radiator and other engine accessories (e.g. a hydraulic pump and a battery). There is room for improvement to enable maintenance work to be done efficiently.

The Japanese utility model application laid open under No. 5-64231 discloses a small backhoe. This backhoe includes an engine hood having a driver's seat. The entire hood may be opened wide to enable inspection and maintenance of a motor section.

The Japanese patent application laid open under No. 6-72443 discloses a swivel type working vehicle including an engine hood which may be split into two, forward and rearward, portions. The forward portion of the engine hood is fixed to a vehicle body, while the rearward portion is pivotable about a transverse axis to open upward and toward the forward portion.

As seen from FIG. 3 of this application, the vehicle includes a driver's seat slidable longitudinally of the vehicle body. When the rearward portion of the engine hood is opened, the driver's seat is slid forward to allow an increased degree of opening of the rearward portion. The forward portion of the engine hood defines a recess in a left forward region thereof to receive the driver's seat.

SUMMARY OF THE INVENTION

An object of the present invention is to provide a backhoe having an engine hood defining a recess in an upper position thereof for receiving a driver's seat, which secures a hood interior with improved storage efficiency, allows an engine inside the hood to be cooled efficiently, and realizes engine cooling equipment with a relatively simple construction.

The above object is fulfilled, according to the present invention, by a backhoe having the following construction.

(I)

A backhoe having an engine hood defining a recess for receiving part of a bottom surface of a driver's seat, and an engine mounted in horizontal posture inside the engine hood, the engine hood including:

a first hood space extending downward from a seat receiving surface of the recess;

a second hood space and a third hood space arranged outwardly of a first side plane and a second side plane extending along left and right inner surfaces of the recess, respectively; and a fourth hood space surrounded by an imaginary rear plane of the first hood space and inner side planes of the second and third hood spaces;

wherein a cooling air intake is formed in one of the second and third hood spaces, and a cooling air outlet is formed in the other of the second and third hood spaces; and wherein a large part of the engine is disposed in the first hood space, and a radiator is disposed in the other of the second and third hood spaces where the air outlet is formed.

With the backhoe having the above construction, the driver's seat is fitted in the recess formed in the upper surface of the engine hood, with the engine mounted in horizontal posture below the recess. In this way, the seat surface of the driver's seat and foot rests have heights which may be adjusted to most ideal dimensions based on human engineering, taking a standard length from heels to knees of the driver, without increasing the height of the backhoe as a whole. Engine accessories such as the radiator, battery and the like requiring greater heights than the engine in horizontal posture may be mounted in the high, second and third hood spaces formed laterally of the recess. Thus, the interior spaces of the engine hood are effectively utilized. In this way, the seat receiving surface of the engine hood may be restricted to a predetermined level above the ground. The height of the entire backhoe need not be increased, nor the longitudinal dimensions of the backhoe. The engine and its accessories may be arranged efficiently in the engine room. The air outlet or air intake is formed in either the second hood space or the third hood space. Consequently, a passage for allowing cooling air to flow longitudinally of the engine is formed in the engine room without requiring a mechanism for guiding air exiting the radiator. Despite the relatively simple construction, the engine may be cooled efficiently.

In this way, the engine and its accessories may be arranged efficiently inside the engine hood without substantially increasing overall dimensions of an existing backhoe. Further, a seat height is set to a proper level suited to the driver based on human engineering, without increasing the height of the foot rests above the ground. The engine may be cooled relatively easily by forming the air intake and air outlet in the left and right hood spaces, without requiring a mechanism such as a radiator exhaust duct.

(II)

Another object of the invention is to provide a backhoe having an engine hood defining a recess for receiving a driver's seat, in which the engine hood is constructed to facilitate inspection and maintenance of an engine, a radiator and other engine accessories (e.g. a hydraulic motor and a battery).

The above object is fulfilled by a backhoe having a construction as described in section (I) above, wherein the engine hood is dividable into a forward hood portion and a rearward hood portion, the rearward hood portion being openable forwardly and upwardly of a backhoe body, and wherein the driver's seat is pivotally connected in a forward position thereof to the forward hood portion to be pivotable between a first position taken during a backhoe operation and a second position tilted forwardly of the forward hood portion.

With the backhoe having the above construction, when inspecting or maintaining the interior of the engine room, the operator may tilt the driver's seat forward and open the rearward portion of the engine hood divided in the fore and aft direction forward and upward. Since the engine hood is divided into two parts, the hood is lighter and may be opened more easily than where the entire hood has to be lifted. The driver's seat is tiltable forward not to interfere with part of the engine hood when the rearward hood portion is opened, whereby the rearward hood portion may be opened to a large extent. Consequently, the operator may carry out inspection and maintenance of the engine, radiator and other engine accessories with ease.

(III)

A further object of the invention is to provide a backhoe having an engine hood defining a recess for receiving a driver's seat, in which the engine hood has a divided construction including a mechanism for preventing entry of rainwater, mud and the like through a plane of division, thereby to enhance waterproofness of the backhoe.

The above object is fulfilled by a backhoe having a construction as described in section (II) above, further comprising a waterproofing mechanism provided between the forward hood portion and the rearward hood portion, wherein the waterproofing mechanism includes an elastic seal and draining troughs, the elastic seal being disposed at a joint between the forward hood portion and the rearward hood potion corresponding to a bottom surface and left and right side surfaces of the recess, the draining troughs being formed in other regions of the joint.

With the backhoe having the above construction, water is prevented from entering the engine room through the joint between the forward hood portion and rearward hood portion.

Other features and advantages of the invention will be apparent from the following description of the preferred embodiments to be taken with reference to the accompanying drawings.

DETAILED DESCRIPTION OF THE PREFERRED EMBODIMENTS

Overall Backhoe Construction

Figure 1:
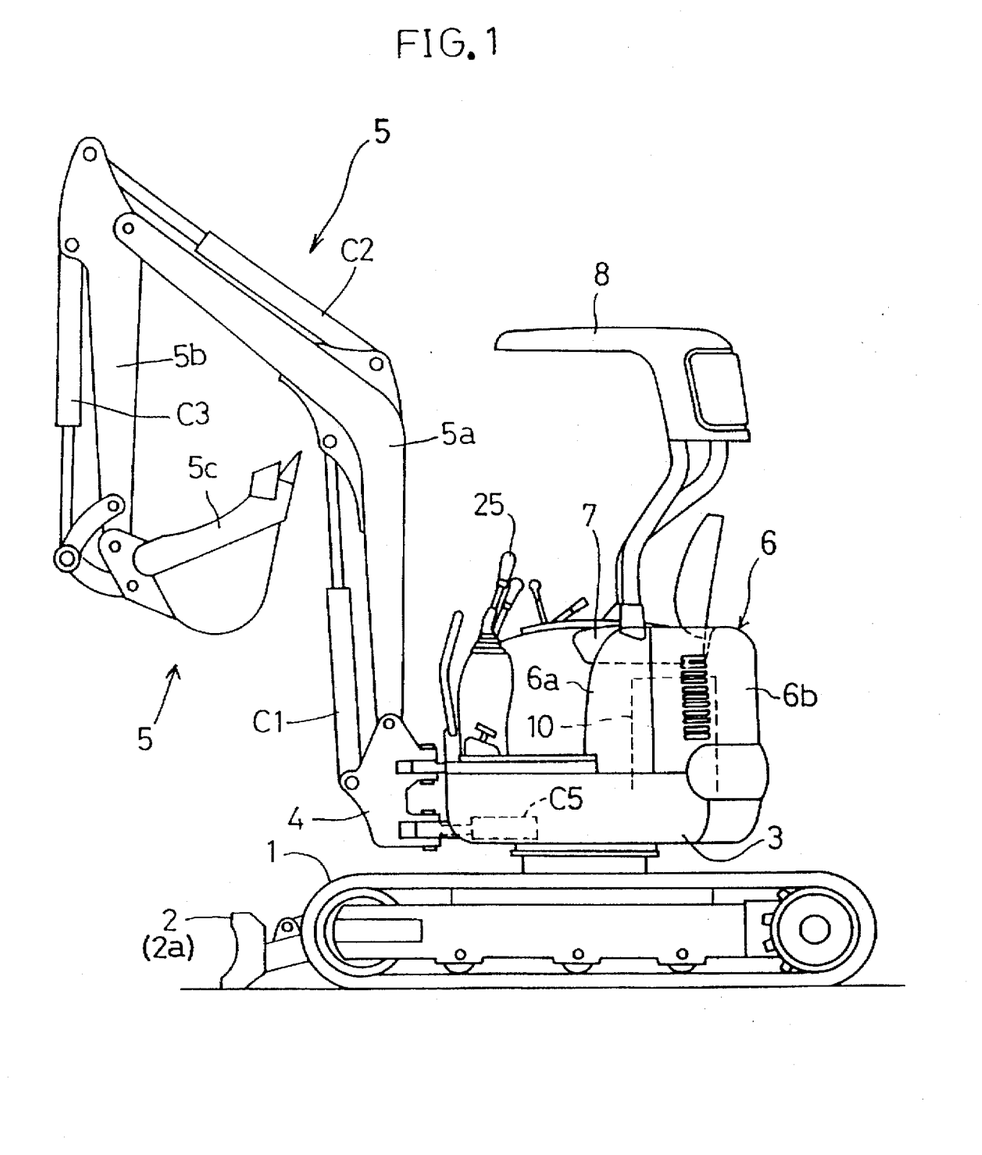
FIG. 1 is a side elevation of a backhoe.

FIG. 1 shows an entire, small dozer type backhoe. The backhoe includes a chassis having a pair of right and left caterpillar tracks 1 and a vertically movable dozer blade 2. A swivel deck 3 is mounted on the chassis to be swivelable about a vertical axis. A swing bracket 4 is attached to a forward end of the swivel deck 3 to be swingable right and left by a swing cylinder C5. A backhoe implement 5 is attached to the swing bracket 4, which includes, connected successively, a boom 5a vertically pivotable by a boom cylinder C1, an arm 5b stretchable and bendable by an arm cylinder C2, and a bucket 5c pivotable back and forth in scooping action by a bucket cylinder C3. A driver's seat 7 is disposed above a motor section in an engine hood 6. A canopy 8 covers an area over the driver's seat 7.

The right and left caterpillar tracks 1 are movable laterally outwardly and inwardly by hydraulic cylinders C4, respectively, to vary a ground engaging distance therebetween.

The dozer blade 2 has opposite end elements 2a sideways extendible and retractable by hydraulic cylinders C6, respectively. One of the end elements 2a is extended or retracted synchronously with movement of the caterpillar track 1 at the same side to vary the distance between the two caterpillar tracks 1.

Engine Hood:

For expediency of description, the terms relating to directions such as sideways, rightward, leftward, forward and rearward are used herein with reference to the driver seated on the seat 7. That is, the driver has his or her front facing forward, the back facing rearward, the left side facing leftward and the right side facing rightward. Other directions will be described, as necessary, when they occur herein.

Figure 2:
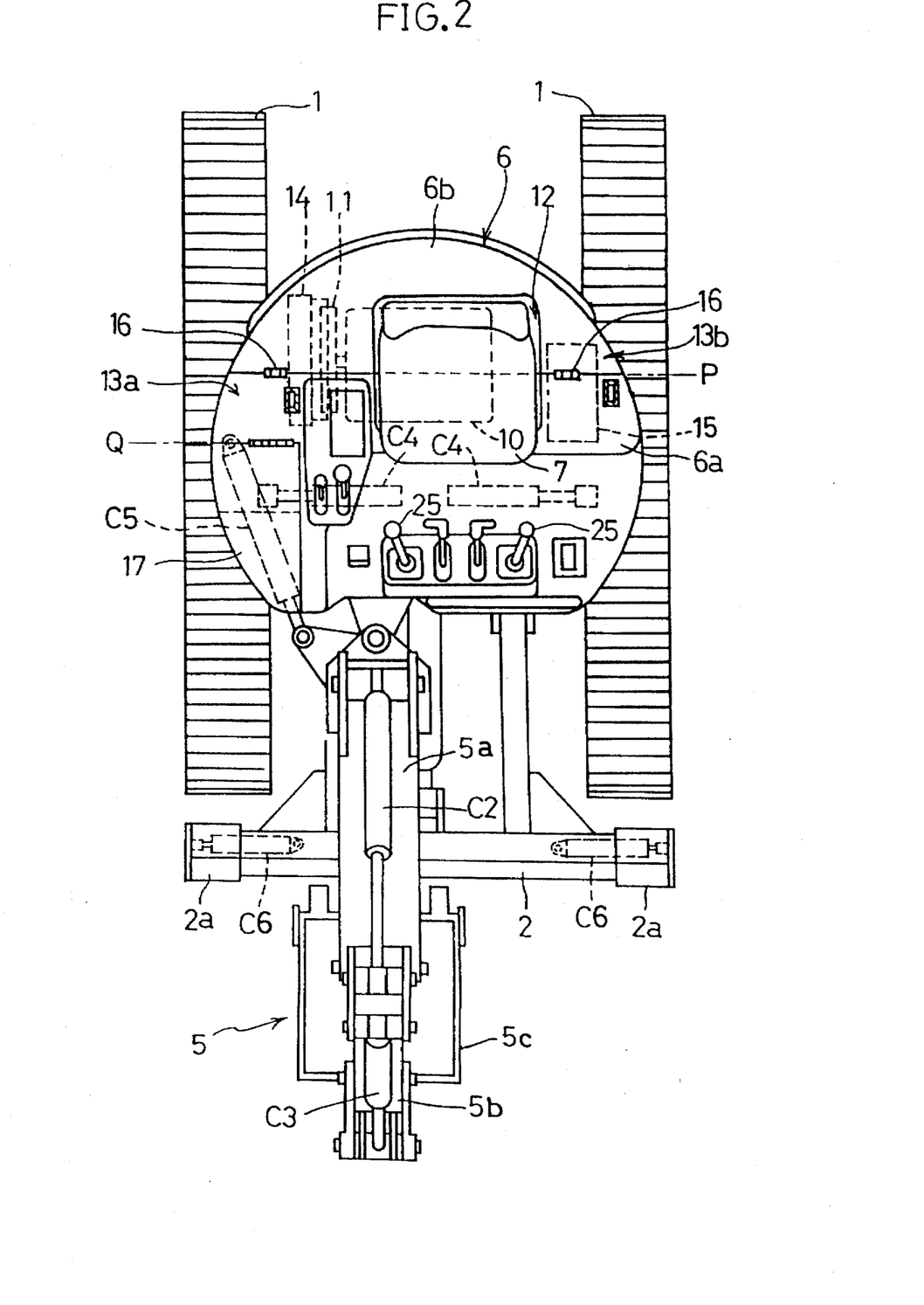
FIG. 2 is a plan view of the backhoe.
Figure 3:
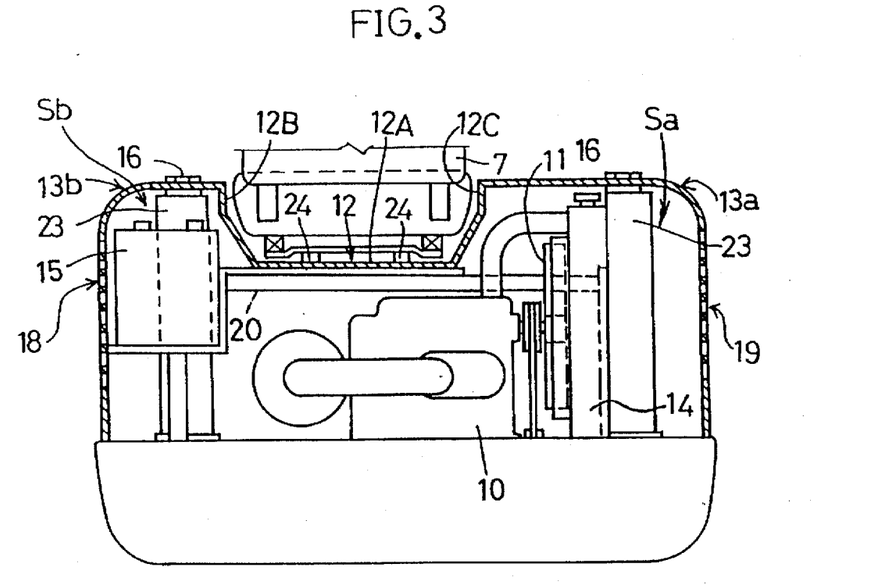
FIG. 3 is a rear view in vertical section of a motor section.
Figure 6:
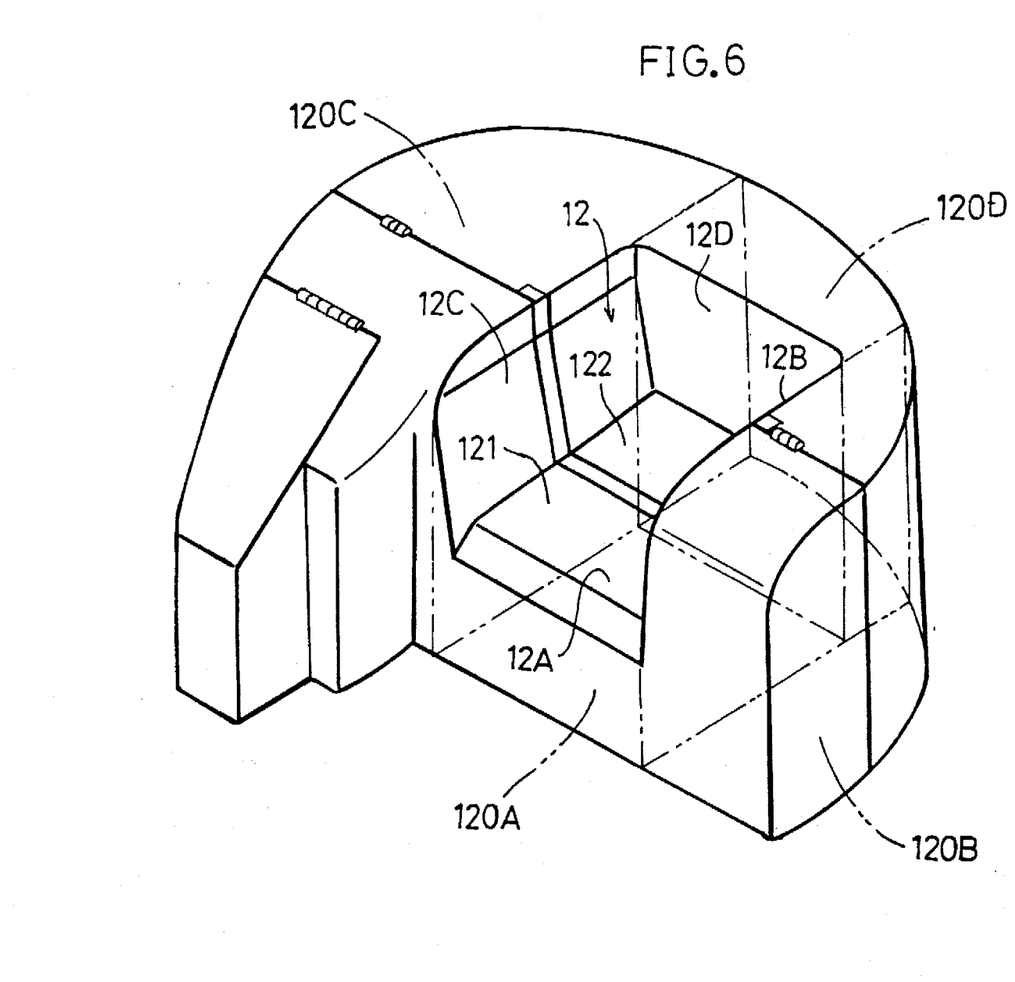
FIG. 6 is a perspective view showing an interior of the engine hood.

As shown in FIGS. 2 and 3, the engine hood 6 defines a first hood space under a portion thereof where a recess 12 is formed, left and right hood spaces (corresponding to the second and third hood spaces) disposed laterally of the first hood space, and a fourth hood space disposed rearwardly of the first hood space. These spaces will be described in detail with reference to FIG. 6. The first hood space 120A is a space of rectangular parallelopiped shape having a bottom surface 12A of the recess 12 forming an upper plane thereof. The recess 12 has left and right side surfaces 12B and 12C. The left and right hood spaces (i.e. the second and third hood spaces 120B and 120C) have inward side planes parallel to the side surfaces 12B and 12C, respectively. The fourth hood space 120D is the remaining hood space surrounded by a rear plane of the first hood space 120A and the inward side planes of the left and right hood spaces 120B and 120C.

Where the left and right side surfaces 12B and 12C of the recess 12 are inclined vertically or in a fore and aft direction, the vertical planes extending in the fore and aft direction through positions at a maximum transverse distance between the side surfaces 12B and 12C are defined as the left and right side surfaces 12B and 12C. A similar definition is applicable to a rear surface 12D of the recess 12. The space surrounded by these left and right side surfaces 12B and 12C and rear surface 12D is defined as the first hood space 120A.

As seen from FIG. 2, an engine 10 is mounted with a large part thereof lying in the first hood space 120A. A radiator 14 is entirely fitted in the right hood space 120C. A battery 15 which is one of the accessories is entirely fitted in the left hood space 120B. In this way, a large part of engine 10 in horizontal posture is disposed in the first hood space 120A having a reduced height, and the radiator 14 and other accessories are disposed in the high right and left portions of the hood 6. The recess 12 of the hood 6 accommodates a lower portion of the driver's seat 7.

Division of the Engine Hood:

As shown in FIGS. 2, 4, 5a and 5b, the engine hood 6 is divided into a fixed forward hood portion 6a, and a rearward hood portion 6b hinged to an upper end of the forward hood portion 6a to be pivotable upward to an open position. The rearward hood portion 6b is pivotable about a transverse axis P.

As shown in FIG. 2, the hood 6 has an inspection cover 17 attached to a righthand position of the fixed forward hood portion 6a to be vertically pivotable about a transverse axis Q between an open position and a closed position. This cover 17 covers a pressure oil tank and a fuel tank mounted in a forward righthand region of the forward hood portion 6a.

As shown in FIG. 6, the forward hood portion 6a encompasses a forward portion of the first hood space 120A and forward portions of the second and third hood spaces 120B and 120C. The rearward hood portion 6b encompasses a rearward portion of the first hood space 120A, rearward portions of the second and third hood spaces 120B and 120C, and the entirety of the fourth hood space 120D.

Figure 4:
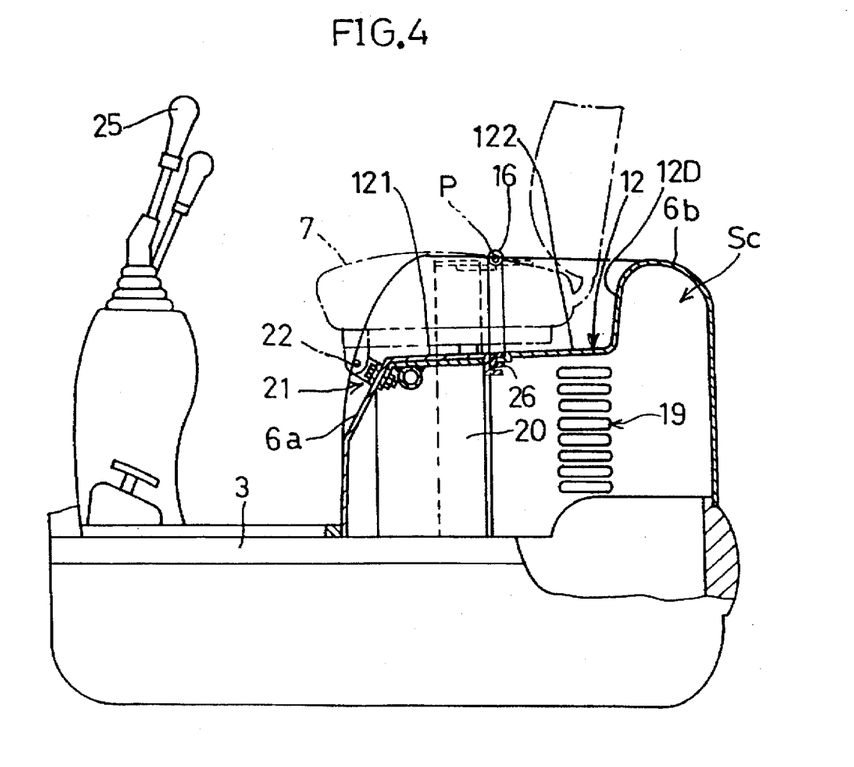
FIG. 4 is a side view, partly in section, of a swivel deck.
Figure 5A:
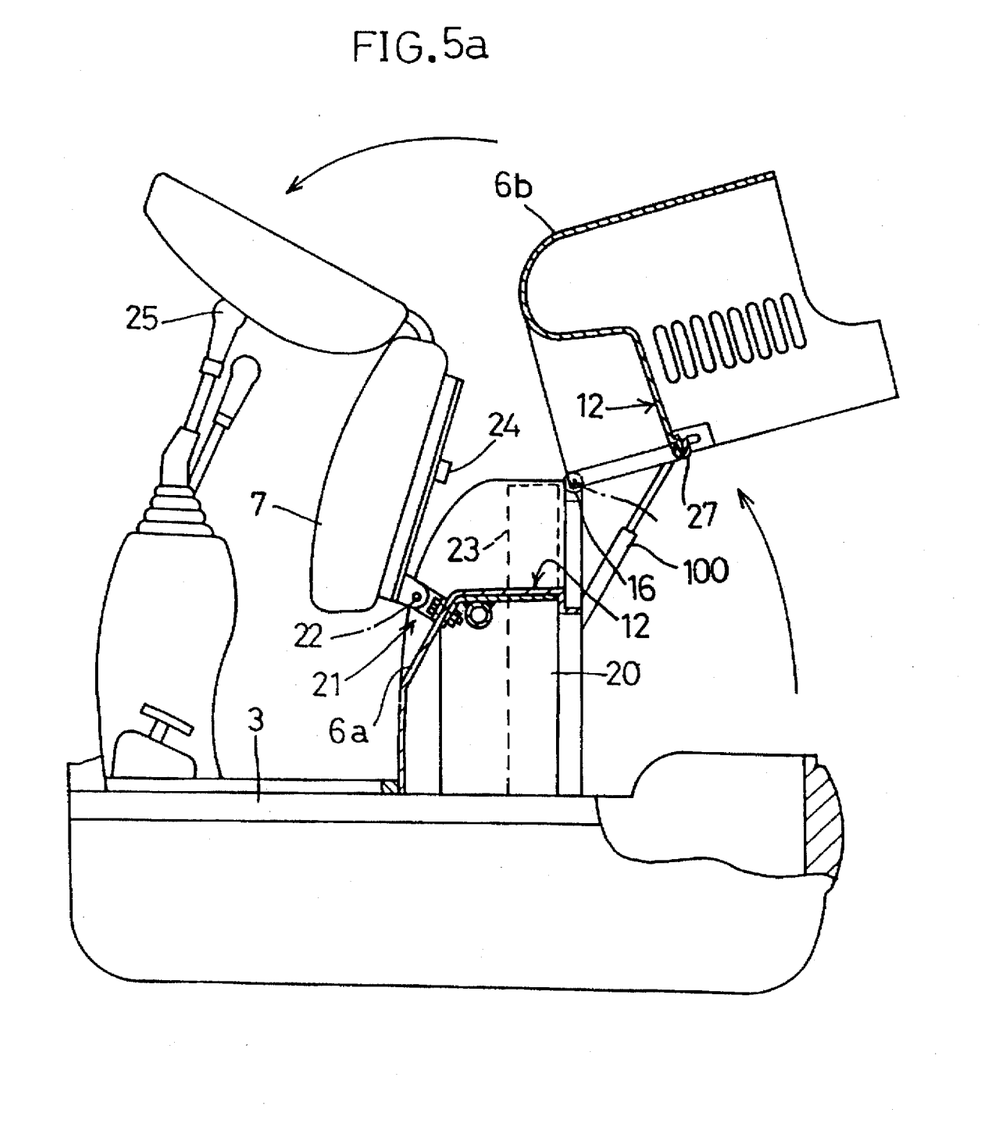
FIG. 5a is a side view, partly in section, of the swivel deck with an engine hood opened.

As seen from FIGS. 4 and 5a, the recess 12 is divided into a first recess 121 formed in the forward hood portion 6a, and a second recess 122 formed in the rearward hood portion 6b.

Figure 5B:
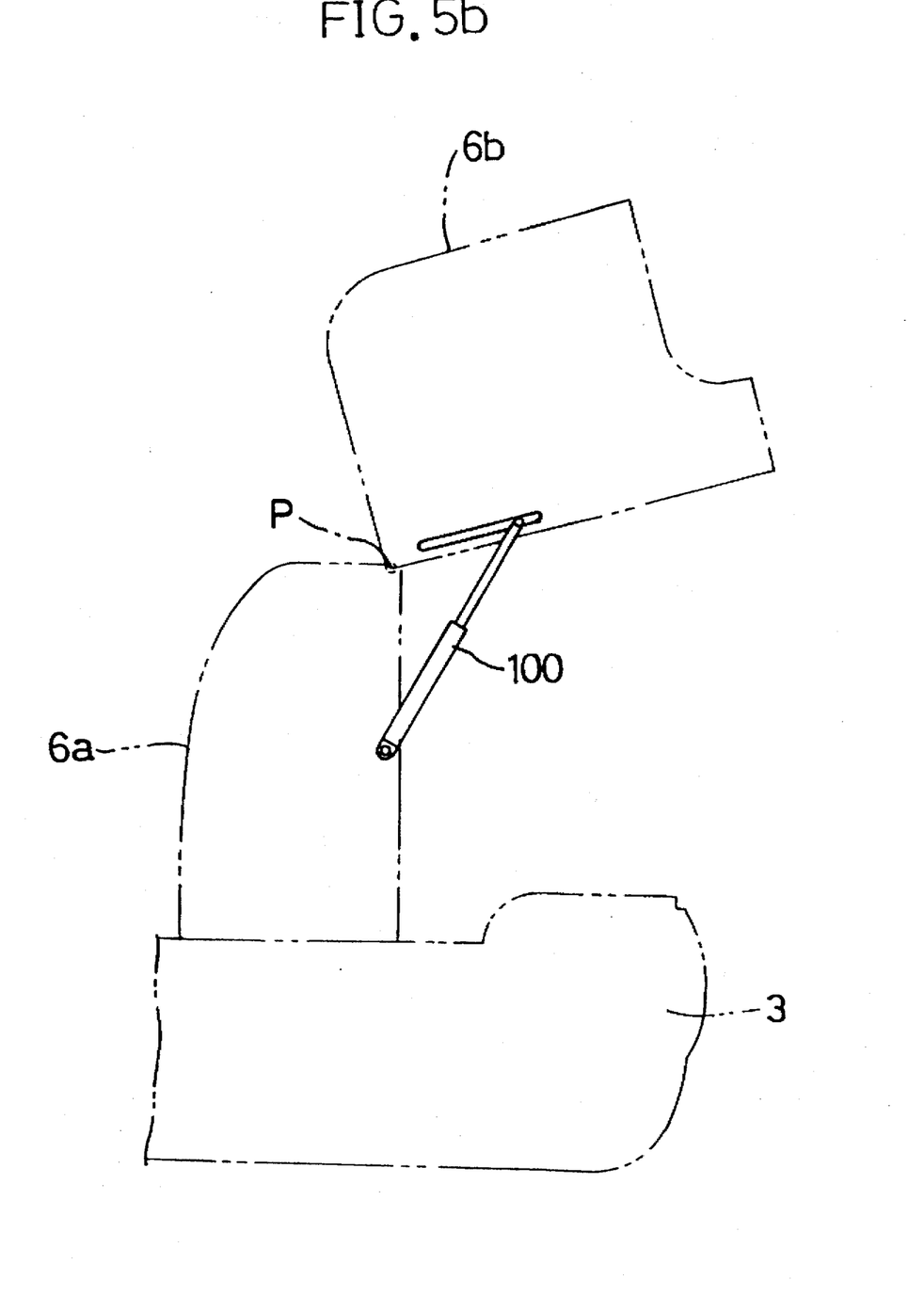
FIG. 5b is a side view showing a retaining mechanism for retaining the engine hood in an open position.

Forward Tilt of the Driver's Seat:

As shown in FIGS. 5a and 5b in particular, the driver's seat 7 is attached to the forward hood portion 6a to be forwardly tiltable. For an inspection of the engine room, the driver's seat 7 may be tilted forward and the rearward hood portion 6b lifted open. That is, the driver's seat 7 is attached to the fixed forward hood portion 6a, and the openable rearward hood portion 6b is formed lightweight and has a relatively low degree of strength. Thus, the rearward hood portion 6b is pivotable to open and close with a reduced operating force. The rearward hood portion 6b is formed large by setting a hood dividing line such that the rearward hood portion 6b includes a lower portion of the driver's seat 7, and that the rearward hood portion 6b is openable to a large extent, with the driver's seat 7 tilted forward. This construction facilitates inspection and maintenance of the motor section. As shown in FIG. 5b, the rearward hood portion 6b opened upward is maintained in the open position by a support element such as a link 100 or a gas damper.

As shown in FIGS. 4 and 5a, seat fittings 21 are fastened along with the forward hood portion 6a to a gate-shaped stationary support 20 erected on the swivel deck 3.

The driver's seat 7 is connected to the seat fittings 21 to be tiltable forward about an axis 22. Further, struts 23 are erected on the swivel deck 3 for supporting the forward hood portion 6a in rear end positions thereof. The driver's seat 7 has rubber seat elements 24 attached to a bottom surface thereof to rest on rear end positions of the forward hood portion 6a and to support the driver's seat 7 in a seating position (corresponding to the first position). As shown in FIG. 5a, the driver's seat 7 in a forwardly tilted position (corresponding to the second position) contacts a control lever 25. A lock mechanism may be provided on an upper surface of the forward hood portion 6a for maintaining the driver's seat 7 in the first position. Details of the lock mechanism will not be described herein.

Cooling Air Passage:

As shown in FIGS. 3 and 4, an air intake 18 is formed in the left side of the rearward hood portion 6b (corresponding to the rearward portion of the second hood space 120B). An air outlet 19 is formed in the right side of the rearward hood portion 6b (corresponding to the rearward portion of the third hood space 120C). Ambient air is drawn into the engine room through the air intake 18 and, after cooling the radiator 14, discharged through the air outlet 19.

The fourth hood space 120D includes an upper portion Sc defining an air passage for guiding cooling air drawn in through the air intake 18 to a position rearwardly of the radiator 14. Thus, ambient air drawn by suction of a cooling fan 11 through the air intake 18 into the second hood space 120B in the engine room flows easily to the third hood space 120C in which the radiator 14 is mounted, with little resistance through the air passage (inner space) in the fourth hood space 120D.

The battery 15 is disposed adjacent the air intake 18, so that the battery 15 is cooled efficiently by cold ambient air immediately after its introduction through the air intake 18.

Figure 7:
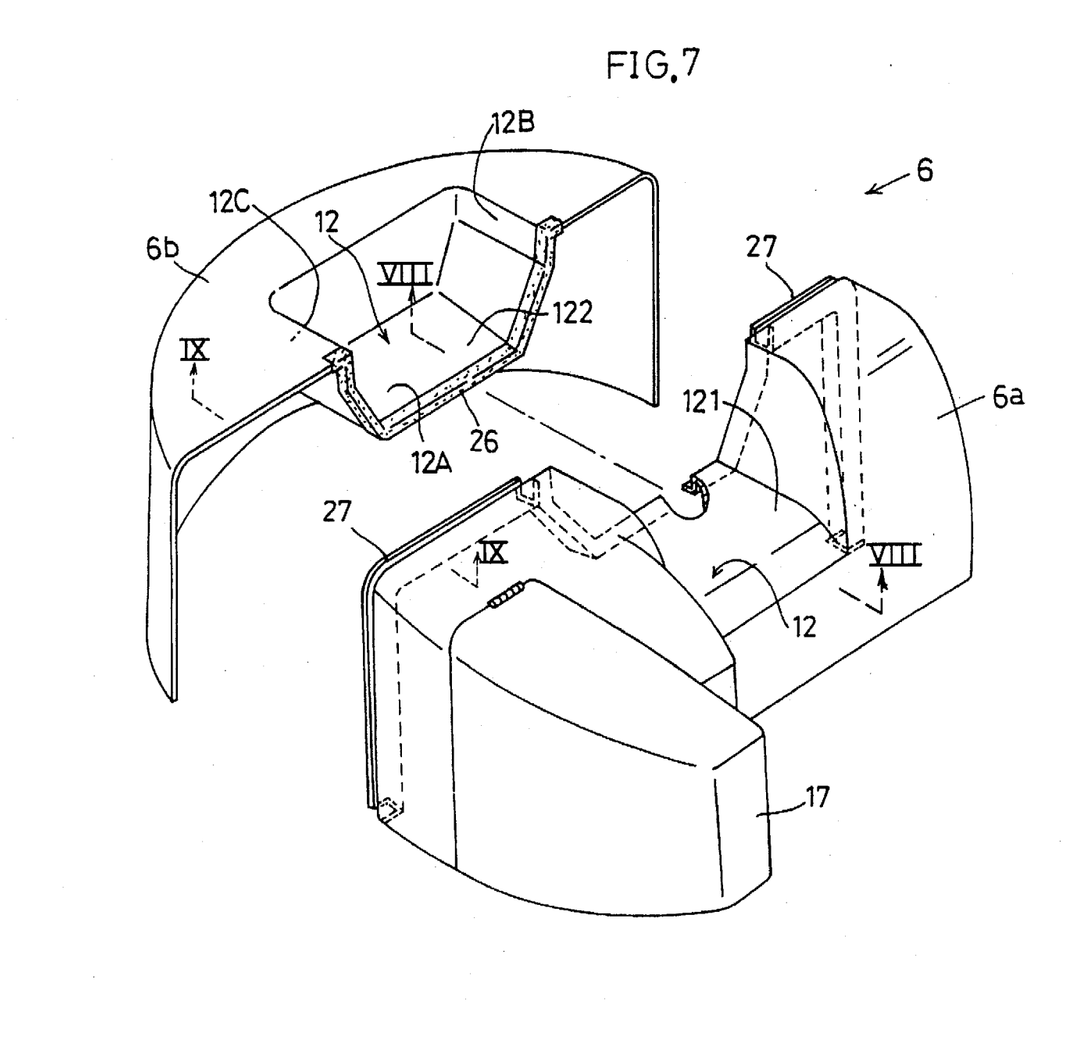
FIG. 7 is an exploded perspective view showing a waterproofing mechanism of the engine hood.
Figure 8:
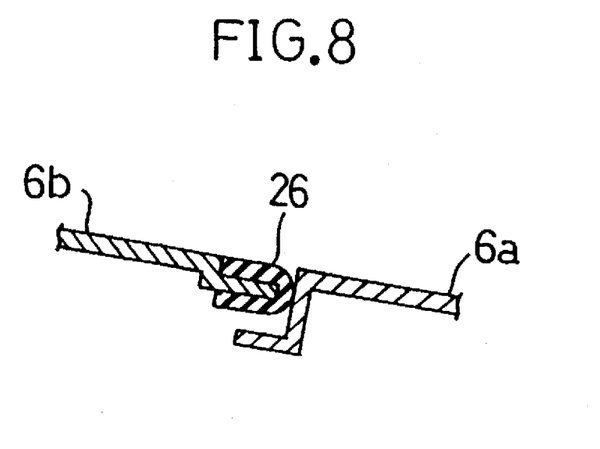
FIG. 8 is a section taken on line VIII—VIII of FIG. 7.
Figure 9:
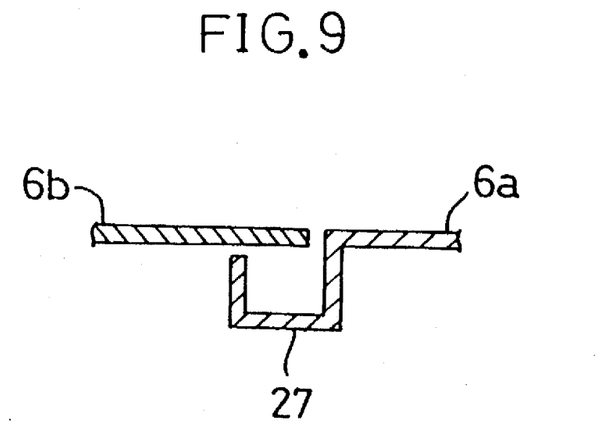
FIG. 9 is a section taken on line IX—IX of FIG. 7.

Waterproofing Structure at Joint between Forward Hood Portion and Rearward Hood Portion:

As shown in FIGS. 7 through 9, a waterproofing measure is applied between the forward hood portion 6a and forward hood portion 6a in the form of an elastic rubber seal 26 fitted on the rearward hood portion 6b in positions corresponding to the bottom surface 12A and left and right side surfaces 12B and 12C of the recess 12. Further, draining troughs 27 are formed integral with the forward hood portion 6a in positions corresponding to the upper surface and left and right side surfaces of the engine hood 6.

Thus, the elastic seal 26 is applied, by way of waterproofing measure, to the positions corresponding to the bottom surface 12A and left and right side surfaces 12B and 12C of the recess 12 from which water cannot easily be drained by natural downflow. The draining troughs 27 (corresponding to the drain passages) are used to waterproof the positions corresponding to the upper surface and left and right side surfaces of the engine hood 6. This construction is more durable than a waterproofing treatment using an elastic seal throughout the dividing line between the fixed forward hood portion 6a and openable rearward hood portion 6b.

In this way, according to the present invention, the motor section may be disposed easily in the interior space of the engine hood and allows maintenance of the motor section to be carried out with ease while placing the driver's seat at a height above the engine hood for the driver to sit on comfortably. The engine hood may be opened with a significantly reduced operating force to expose a large area of the motor section. In addition, the seal of the engine hood has improved durability.

Figure 10:
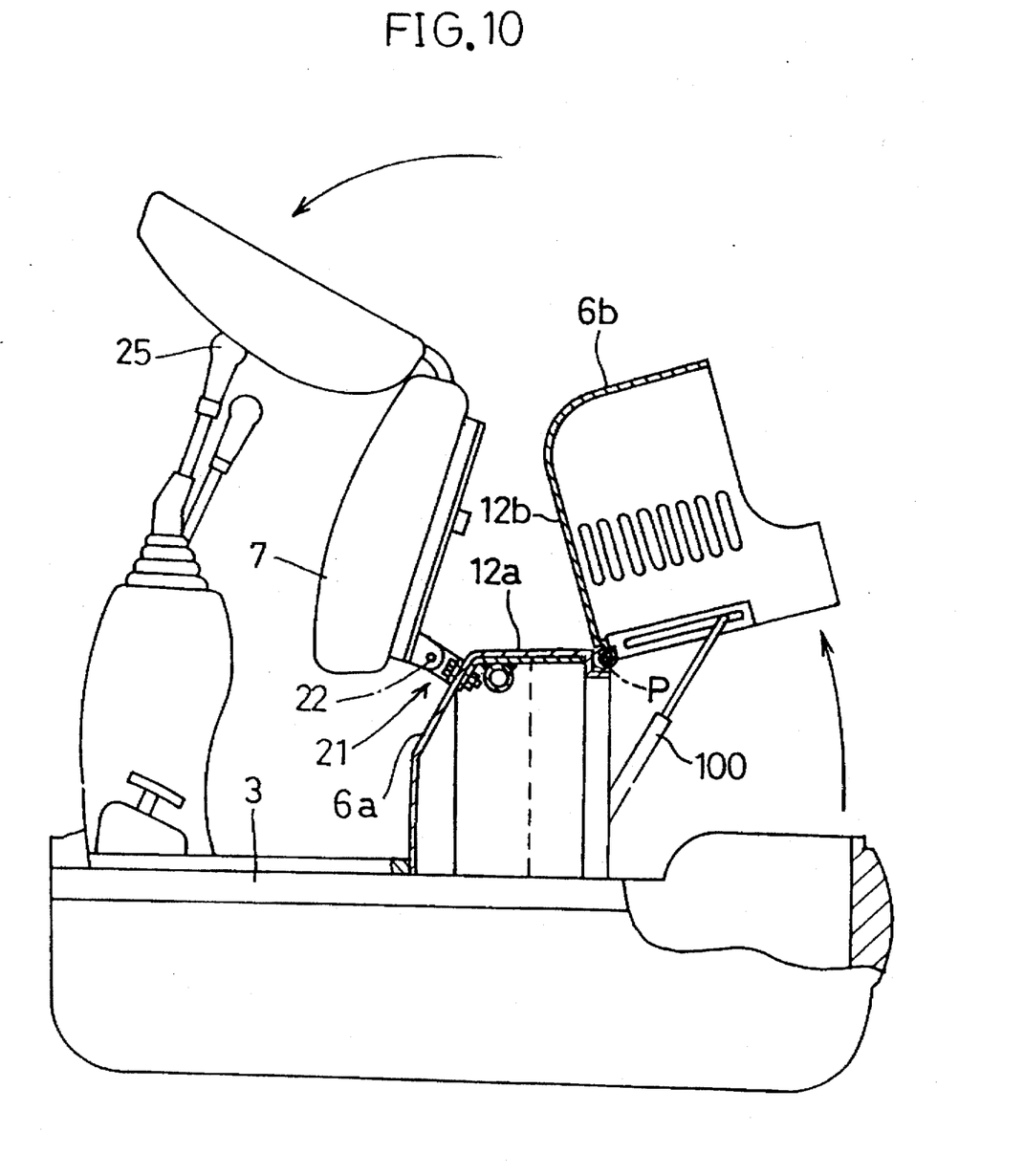
FIG. 10 is a view showing a modified engine hood.

Other Embodiments:

As shown in FIG. 10, the recess 12 described in the foregoing embodiment may be eliminated from the engine hood. With this hood construction, as distinct from the foregoing embodiment, a level difference between foot rests and driver's seat may not be made optimal based on human engineering. However, an effect comparable to that of the foregoing embodiment may be produced such as by selecting a radiator having a reduced height. Where this hood construction is employed, the waterproofing may be in the form of troughs only. As will be apparent from a comparison between FIG. 5a and FIG. 10, this hood construction is substantially the same as the hood construction in the foregoing embodiment except (1) that the hood space is not divided into the first, second, third and fourth hood spaces, (2) that the recess 12 is not formed, and (3) that the waterproofing mechanism is different. Details of this hood construction will not be described here.

An air cleaner, a muffler or the like, instead of the battery, may be disposed in one of the second and third hood spaces 120B and 120C of the engine hood 6. These battery, air cleaner, muffler and the like are collectively called engine accessories 15 herein.

The recess 12 may be formed throughout the entire fore and aft length of the engine hood 6 to extend along a transversely middle region thereof.

The direction of suction by the radiator cooling fan 11 may be reversed, with air intake 18 formed adjacent the radiator 14, and air outlet 19 adjacent the battery 15.

The pivoting direction of the rearward hood potion 6b may be varied as appropriate. Further, the rearward hood portion 6b may be detachably attached.

The specific construction of the stationary support 20 and the specific construction for forwardly pivotably connecting the driver's seat 7 to the fixed forward hood portion 6a may be varied as desired.

The elastic seal 26 for seating the engine hood 6 may comprise any known material, shape, attaching structure and so on. The formation and shape of the draining troughs 27 may also be varied as desired.

The type of backhoe is variable as appropriate. For example, the backhoe implement 5 may be fixed against swinging sideways, the dozer blade 2 and canopy 8 may be omitted, or a driver's cab may be provided.

What is claimed is:

1. A backhoe having an engine hood defining a recess for receiving part of a bottom surface of a driver's seat, and an engine mounted in horizontal posture inside the engine hood, said engine hood including:
   a first hood space extending downward from a seat receiving surface of said recess;
   a second hood space and a third hood space arranged outwardly of a first side plane and a second side plane extending along left and right inside surfaces of said recess, respectively; and
   a fourth hood space surrounded by a rear plane of said first hood space and said second and third hood spaces;
   wherein a cooling air intake is formed in one of a first and second engine hood side surfaces, and a cooling air outlet is formed in the other of said first and second engine hood side surfaces; and
   wherein a large part of said engine is disposed in said first hood space, and a radiator is disposed in one of said second and third hood spaces substantially adjacent to where said air outlet is formed.

2. A backhoe as defined in claim 1, wherein said engine hood is constructed such that cooling air drawn in through said air intake and discharged through said air outlet flows through said fourth hood space.

3. A backhoe as defined in claim 1, wherein said engine hood is pivotally attached to a portion of the backhoe body and is dividable into a forward hood portion and a rearward hood portion, said rearward hood portion being openable forwardly and upwardly of the backhoe body.

4. A backhoe as defined in claim 3, wherein said recess has a first recess formed in said forward hood portion for receiving part of said driver's seat.

5. A backhoe as defined in claim 3, wherein said recess has a second recess formed in said rearward hood portion for receiving a rearward part of said driver's seat.

6. A backhoe as defined in claim 3, wherein said forward hood portion includes parts of said first hood space and said second and third hood spaces, and said rearward hood portion includes parts of said first hood space and said second and third hood spaces, and the entire said fourth hood space.

7. A backhoe as defined in claim 6, wherein said rearward hood portion is pivotably connected at an upper forward end thereof to an axis extending transversely of the backhoe body.

8. A backhoe as defined in claim 5, wherein said driver's seat is pivotally connected in a forward position thereof to said forward hood portion to be pivotable between a first position taken during a backhoe operation and a second position tilted forwardly of said forward hood portion.

9. A backhoe as defined in claim 8, wherein said rearward hood portion is pivotable by at least 90 degrees but less than 180 degrees relative to said forward hood portion when said driver's seat is in said second position.

10. A backhoe as defined in claim 8, wherein said rearward hood portion includes a lock mechanism for locking said rearward hood portion when said driver's seat is in said first position.

11. A backhoe as defined in claim 8, wherein said second position of said driver's seat is determined by a contact with a backhoe control lever.

12. A backhoe as defined in claim 3, further comprising a waterproofing mechanism provided between said forward hood portion and said rearward hood portion.

13. A backhoe as defined in claim 12, wherein said waterproofing mechanism includes an elastic seal and draining troughs, said elastic seal being disposed at a joint between said forward hood portion and said rearward hood portion, said joint elastic seal being formed in a first region extending from a bottom surface to left and right side surfaces of said recess, each of said draining troughs being formed in a second region of said joint which is not co-extensive with said first region.

14. A backhoe as defined in claim 13, wherein each of said draining troughs comprises a groove having a U-shaped section.

* * * * *